United States Patent [19]

Hiratsuka et al.

[11] 4,315,882

[45] Feb. 16, 1982

[54] ELASTOMERIC SHAPED ARTICLE AND METHOD FOR PREPARING THE SAME

[75] Inventors: Motoki Hiratsuka, Nagoya; Chiaki Tanaka, Chita; Nagayoshi Naito, Nagoya, all of Japan

[73] Assignee: Toray Industries, Inc., Tokyo, Japan

[21] Appl. No.: 186,407

[22] Filed: Sep. 11, 1980

Related U.S. Application Data

[63] Continuation-in-part of Ser. No. 31,312, Apr. 18, 1979, abandoned.

[30] Foreign Application Priority Data

Apr. 21, 1978 [JP] Japan ................................ 53-46468

[51] Int. Cl.$^3$ .............................................. B29F 3/10
[52] U.S. Cl. ............................... 264/171; 260/22 CQ; 260/28 R; 264/211; 264/349; 525/408; 525/411; 525/444
[58] Field of Search ...................... 525/408, 411, 444; 260/22 CQ, 28 R; 264/171, 211, 349

[56] References Cited

U.S. PATENT DOCUMENTS

| | | | |
|---|---|---|---|
| 3,907,926 | 9/1975 | Brown et al. | 260/45.95 R |
| 3,917,743 | 11/1975 | Schroeder et al. | 260/45.9 R |
| 4,130,603 | 12/1978 | Tanaka et al. | 428/195 |

Primary Examiner—Melvyn I. Marquis
Attorney, Agent, or Firm—Austin R. Miller

[57] ABSTRACT

An improved shaped article can be prepared from a blockcopolyetherester by (a) mixing the same with poly(butylene terephthalate) at a temperature of about 200° to about 230° C. whereby fine fragments of poly(butylene terephthalate) which maintains its own crystalline phase are dispersed in the matrix of the blockcopolyetherester, and (b) molding the mixture at a temperature below the melting point of the poly (butylene terephthalate). The addition of an ester wax and/or a calcium soap improves the extrusion-moldability of the mixture.

7 Claims, No Drawings

ELASTOMERIC SHAPED ARTICLE AND METHOD FOR PREPARING THE SAME

This application is a continuation-in-part of Ser. No. 031,312, filed Apr. 18, 1979 and now abandoned.

This invention relates to an elastomeric shaped article having improved transparency and surface appearance. The shaped article, as it relates to mold release, can be prepared with improved moldability, that is, mold release, molding cycle and molding viscosity, etc.

It is well-known that a blockcopolyetherester (hereinafter called "polyetherester") consisting of a polyester hard segment such as a poly(butylene terephthalate) sequence and a polyether soft segment such as poly(tetramethylene oxide) sequence in a polymer chain has elastomeric properties and can be used as a thermoplastic elastomer. Since the polyetherester has excellent tear strength, tensile strength, flex life, impact strength, oil resistance and heat stability, it can be utilized in various products which require one or more of the above properties. Tires, tubes, hoses, belts, caterpillars of snowmobiles and various mechanical parts are examples of such uses.

However, this type of elastomer is inferior to rubber with respect to elastic recovery and flexibility. Therefore, it is considered unsuitable for uses that require these properties.

Such faults can be overcome to some extent by increasing the content of the polyether soft segment, but if this is done some of the advantageous properties of the polymer such as oil resistance, heat stability and mechanical strength are somewhat diminished. Another way to compensate for the undesirable properties of this type of elastomer is to use a copolyester sequence as the hard segment. However such a copolyetherester has poor moldability due to the surface tackiness and poor crystallizability of the polymer.

Thus, an important object of the present invention is to provide an elastomeric shaped article consisting of a blockcopolyetherester which has excellent flexibility and elasticity at either lower or elevated temperatures in addition to having good heat stability, oil resistance and mechanical strength.

Another object of the present invention is to provide a method for preparing such an elastomeric shaped article having excellent mold release, molding cycle and proper molding viscosity.

We have found that an excellent elastomeric shaped article can be obtained when from about 0.1 to 10 parts by weight of poly(butylene terephthalate) are mixed with about 100 parts by weight of blockcopolyetherester at a temperature of above about, preferably 200° C. to 230° C., whereby the poly(butylene terephthalate) is finely dispersed in the matrix of the blockcopolyetherester, said poly(butylene terephthalate) being maintained in crystalline phase, and then molding the mixture at a temperature below the melting point of the poly(butylene terephthalate). We also have found that a blockcopolyetherester containing the finely dispersed poly(butylene terephthalate), which maintains its own crystalline phase in the matrix, has excellent moldability and an elevated melt viscosity that is suitable for the molding process.

In the present invention it is important to finely disperse the fragments of poly(butylene terephthalate) maintained in its own crystalline phase, in a polyetherester matrix and to mold the mixture at a temperature below the melting point of the poly(butylene terephthalate). When the poly(butylene terephthalate) is so completely blended with polyetherester that it does not maintain its own crystalline phase, the moldability of the polyetherester is not improved and some objects of the present invention are not attained. Therefore, mixing poly(butylene terephthalate) with the polyetherester at such a high temperature that the poly(butylene terephthalate) is completely molten should be avoided. Molding of the polyetherester containing finely dispersed poly(butylene terephthalate) fragments can also be carried out at such a relatively low temperature.

In a specific embodiment of the present invention one of the simplest ways to prepare a shaped article according to the present invention is to directly shape a dry-blended mixture of pellets or powder of a polyetherester with powder of poly(butylene terephthalate) at a temperature below the melting point of poly(butylene terephthalate), e.g. at about 230° C., preferably 220° C. The powder of poly(butylene terephthalate) should preferably have an average diameter of less than about 200 μm, more preferably less than about 100 μm. In this way the fine fragments of poly(butylene terephthalate) are dispersed in the polyetherester matrix during the shaping procedure in a simple step.

In another embodiment of the present invention, fine fragments of poly(butylene terephthalate) may be dispersed in a polyetherester by using various mixing means, such as a single or twin screw extruder, a kneader, a Banbury mixer or a pair of rollers, before the mixture is fed to the shaping process. This method is advantageous because poly(butylene terephthalate) can be used in pellet form. The most preferable mixing temperature in this case is about 200° C. to 230° C., but a slightly higher temperature can be utilized when other mixing conditions such as mixing time and mixing means are controlled so that it is possible to attain a fine dispersion of poly(butylene terephthalate) fragments in the matrix of the polyetherester.

The polyetherester used in this invention is comprised of a polyester hard segment (1) and a polyether soft segment (2). The polyester hard segment (1) may be formed by a polyester sequence derived from a dicarboxylic acid component composed mainly of terephthalic acid, but which can optionally be combined with other dicarboxylic acids, and a diol component composed mainly of 1,4-butanediol, but which can optionally be combined with other low molecular weight diols. More than about 40 mol % of the polyester sequence may preferably be a butylene terephthalate recurring unit. When the ratio of the poly(butylene terephthalate) recurring unit is less than about 40 mol %, the improvement of the crystallization properties by this invention is not realized practically, since the melting point of the copolymer is not only too low to maintain mechanical strength at high temperature, but its crystallization properties are markedly diminished.

The dicarboxylic acids other than terephthalic acid that can be used in the polyester hard segment may be aromatic dicarboxylic acids such as isophthalic acid, phthalic acid, naphthalene-2,7-dicarboxylic acid, diphenyl-4,4'-dicarboxylic acid, diphenoxyethane dicarboxylic acid, 3-sulfonyl isophthalic acid etc., and cycloaliphatic dicarboxylic acids such as 1,4-cyclohexane dicarboxylic acid, and aliphatic dicarboxylic acids such as succinic acid, oxalic acid, adipic acid, sebacic acid, dodecane diacid, and dimer acid, etc. Among these dicarboxylic acids, isophthalic acid may be preferably used as a comonomer.

The low molecular weight diols other than the 1,4-butane diols that can be used in this invention are aliphatic diols such as ethylene glycol, trimethylene glycol, pentamethylene glycol, hexamethylene glycol, neopentyl glycol, and decamethylene glycol, etc., and cycloaliphatic diols such as 1,1-cyclohexane dimethanol, 1,4-cyclohexane dimethanol, tricyclodecane dimethanol, etc., and diols containing aromatic radicals such as xylylene glycol bis(p-hydroxy) diphenyl, bis(p-hydroxy phenyl)propane, 2,2-bis[4-(2-hydroxyethoxy)-phenyl]propane, bis[4-(2-hydroxy) phenyl] sulfone, and 1, 1-bis[4-(2-hydroxyethoxy)phenyl]cyclohexane etc.

The polyether soft segment (2) of the polyetherester is comprised of a poly(alkylene oxide) sequence derived from a poly(alkylene oxide)glycol having an average molecular weight of between about 300 to 6,000, preferably about 500 to 4,500. If the molecular weight exceeds this range, the poly(alkylene oxide) sequence itself becomes crystallizable, and the elastic properties and compatibility of the copolyetherester are lost. Conversely, with a molecular weight of less than about 300, the length of the polyester hard segment is insufficient to provide good elasticity. The poly(alkylene oxide)-glycol may be polyethylene glycol, poly(1,2-propylene oxide)glycol, poly(tetramethylene oxide)glycol copolymers of ethylene oxide and propylene oxide and copolymers of ethylene oxide and tetrahydrofuran. Most preferred is poly(tetramethylene oxide)glycol because it gives improved heat resistance, improved chemical stability against hydrolysis, and better elastic properties.

It is necessary that the ratio of polyetherester soft segments to polyester hard segments in a polyetherester be from about 80:20 to 5:95, preferably 70:30 to 15:85. If the ratio is greater than about 80:20, the molded products lose their good mechanical and thermal properties, since the beneficial properties of the hard segments are lost. Furthermore, if the ratio is less than about 5:95 the number of poly(alkylene oxide)glycol units having a low Tg is too small to maintain elasticity under normally used temperatures. It is especially preferred that the amount of soft segments be about 70-15% by weight of the polyetherester. The polyetherester, which can be most effectively employed in the present invention, consists of a polyester hard segment comprising about 90 to 50, more preferably about 80 to 50 mol% of a butylene terephthalate recurring unit, and about 10 to 50, or more preferably about 20 to 50 mol% of an other polyester recurring unit and a polyether soft segment comprised of poly(alkylene oxide) recurring units which may amount to about 15 to 70% by weight on the basis of the total polymer.

Such a blockcopolyetherester elastomer has excellent resistance to heat, light and oil chemical stability against hydrolysis, and excellent physical properties such as good tear strength, flexibility and elasticity, but a slow crystallization rate, and poor moldability. However when such a copolyetherester is utilized in the present invention, the enumerated desirable properties are retained and moldability is greatly improved.

The polyetherester above-described may be manufactured by various methods. For example, one may use polycondensation of products obtained by an ester interchange reaction with a lower alcohol ester of a dicarboxylic acid, an excess of low molecular weight glycol and poly(alkylene oxide)glycol in the presence of a catalyst, or which are obtained by an esterification reaction with dicarboxylic acid, glycol and poly(alkylene oxide)glycol in the presence of a catalyst. Furthermore, other methods may be used to randomize previously polymerized poly(butylene terephthalate), other dicarboxylic acid and diol or poly(alkylene oxide)glycol, or other copolyester by means of ester interchange reactions.

Complex titanates can be employed as catalysts for both the ester interchange reaction or the esterification reaction, and for the polycondensation reaction. Especially preferred are tetraalkyl titanates such as tetrabutyl titanate and tetramethyl titanate. The other catalysts are tin compounds such as dibutyltinoxide, dibutyltinlaurate, and lead compounds such as lead acetate.

Polycarboxylic acids, polyfunctional hydroxy combinations, etc., can be copolymerized as part of the dicarboxylic acids. Polyfunctional components with increased viscosity during melt are effective and can be copolymerized at less than 3 mol%. Representative polyfunctional components are trimellic acids, trimesic acid, pyromellitic acid, benzophenone tetracarboxylic acid, butanetetracarboxylic acid, glycerin, pentaerythritol and their esters or acid anhydride derivatives. The polyetherester of this invention has a logarithmic viscosity at least greater than 0.35, preferably about 0.50 to 4.0.

The effect of this invention can be achieved by dispersing fine fragments of poly(butylene terephthalate) in the above-described polyetherester and shaping it at a temperature substantially below the melting point of poly(butylene terephthalate). The term "poly(butylene terephthalate)" as used herein means a homopolyester consisting essentially of terephthalic acid and a 1,4-butane diol component.

The poly(butylene terephthalate) which can be utilized may have a logarithmic viscosity greater than 0.3, and may preferably have a suitably high degree of polymerization and a high degree of crystallization. The poly(butylene terephthalate) is blended with a copolyetherester at a ratio of about 0.1 to 10 parts by weight of poly(butylene terephthalate) per 100 parts of a copolyetherester, preferably about 0.5 to 5 parts by weight of poly(butylene terephthalate). If the amount of poly(butylene terephthalate) is less than about 0.1 part by weight, its effect is not significant enough to improve moldability; conversely, if the amount is greater than about 10 parts by weight, some of the advantageous properties of the polyetherester such as elasticity, flexibility, tear strength and impact resistance tend to be diminished.

The so-called master batch process can be utilized with the method disclosed in this invention. Master pellets comprised of a copolyetherester containing about 5 to 30% by weight of finely dispersed poly(butylene terephthalate) fragments can be used. Such master pellets are melt-blended with a copolyetherester so that the content of poly(butylene terephthalate) becomes about 0.1 to 10 parts by weight per 100 parts by weight of polyetherester.

The shaped article of the present invention can be prepared by conventional molding methods such as injection, extrusion, compression or blow molding. According to the present invention the moldability of a blockcopolyetherester is highly improved with respect to mold release and molding cycle because of the remarkable increase in its crystallization rate. The surface appearance of the shaped article, especially as regards sink marks and warpage is also greatly improved.

When the shaped article of the present invention is a hollow body such as a tube, hose or a blow molded container, the effect of the present invention is markedly recognizable. Copolyetheresters having a low crystallization rate have a high degree of surface tackiness. Therefore, when a tube is molded, the melt extruded tube is apt to adhere to the sizing plate that is installed to control the external diameter of the tube. This problem can be eliminated by increasing the crystallization rate, which in turn causes an increase in the solidification rate. When tubes are molded it is necessary for the polymer to have an elevated melt viscosity in order to maintain cross section uniformity of the tube.

The present invention allows an increase in melt viscosity necessary to satisfy the melt-viscosity level required for extrusion molding of a hollow body. In order to elevate the melt-viscosity about 0.5 to 10, preferably about 1 to 10 parts by weight of poly(butylene terephthalate) are mixed with 100 parts by weight of a copolyetherester at a temperature above about 200° C., preferably about 200° C. to about 230° C., whereby fine fragments of poly(butylene terephthalate) are dispersed in the polyetherester matrix. Then the resulting mixture has an elevated melt viscosity suitable for tubular molding or blow molding at a temperature below about 215° C. The shaped article thus obtained has uniform thickness.

Furthermore, transparency of the shaped article is also improved by the present invention. When a block-copolyetherester is formed by use of a polyester hard segment comprising about 50 to 80 mol% of poly(butylene terephthalate) unit, about 20 to 50 mol% comonomer unit, and a polyalkylene oxide soft segment, and a transparent shaped article is desired, it is extremely effective to mix about 0.1 to 5, preferably about 0.1 to 1 part by weight of poly(butylene terephthalate) at a temperature substantially below the melting point of the poly (butylene terephthalate) in a manner to disperse fine fragments of poly(butylene terephthalate) in the copolyetherester matrix. In this case the crystallization rate of the copolyetherester is naturally enhanced and its moldability is improved.

For the purpose of improving the dispersibility of poly(butylene terephthalate) fragments in the polyetherester matrix, the addition of lubricants selected from ester waxes and calcium soaps is extremely effective. By using these lubricants, the uniformity in viscosity of the composition is improved and an excellent appearance of the shaped articles can be obtained. The addition of an ester wax and/or calcium soap remarkably improves the extrusion moldability of the composition of this invention.

Examples of suitable ester waxes include "Hoechst Waxes" commercially available from Farbwerke Hoechst A. G. of West Germany. For example, "Hoechst Wax" GL 3 which is an ester wax partially neutralized with calcium hydroxide, "Hoechst Wax" OP which is produced by partial esterification of montan wax acids by either ethylene glycol or butanediol with neutralization of unreacted carboxylic groups with calcium hydroxide and "Hoechst Wax" E, which is produced by partial esterification of montan wax acids with ethylene glycol or butanediol are preferably used. With one of these ester waxes an olefin may preferably be added to the molding composition of polyetherester. The olefin wax includes low molecular weight polyethylene wax commercially available from Farbwerke Hoechst A. G. under the name of "Hoechst Wax" PA-190 or PA-520.

The calcium soaps are calcium salts of fatty acids having 10 to 30 carbon atoms. For example, calcium laurate, calcium palmitate, calcium stearate and calcium montanate are preferably used. Calcium stearate is most effective.

The amount of these lubricants used in the present invention is about 0.05 to 5.0 parts by weight per 100 parts of polyetherester.

When molded products are manufactured by means of this invention, known molding additives such as crystalline nucleating agents and lubricants can be used in conjunction with the poly(butylene terephthalate). Known crystalline nucleating agents include talc, carbonates of alkaline earth metal oxides, titanium dioxide, sodium salts of fatty acids and sodium montanates. Known lubricants include waxes, fatty acids, amides thereof, bis-fatty acid amides and fatty alcohols.

The molded products of this invention can also contain stabilizers to heat and light such as antioxidants and U.V. absorbers. Representative thermal stabilizers include hindered phenols such as 4,4'-bis(2,6-ditertiary-butylphenol), 1,3,5-trimethyl-2,4,6-tris-(3,5-ditertiary-butyl-4-hydroxybenzyl)benzene, [tetraxis methylene-3-(3,5-ditertiary-butyl-4-hydroxyphenyl)propionate]methane, N,N'-hexamethylene-bis-(3,5-ditertiary-butyl-4-hydroxy-hydrocinnamoyl amide), aromatic amines such as N,N'-bis-($\beta$-naphthyl)-p-phenylene diamine, 4,4'-bis-($\alpha,\alpha$-dimethylbenzyl) diphenyl amine, sulfur containing compounds such as dilauryl thiodipropionate, phosphor containing compounds, alkaline earth metal oxides, nickel salts or complexes of certain Schiff bases in which the Schiff base is essentially that formed by the condensation of salicyl aldehyde and a substituted aromatic amine such as substituted aniline or amino pyridine. Representative stabilizers to ultraviolet light that can be used along with the polysulfide polymer include substituted benzophenones, benzotriazoles and piperidine compounds such as bis(2,2,6,6,-tetramethyl-4-piperidine)sebacate and 4-benzoyloxy-2,2,6,6-tetramethyl piperidine. Optionally, molded products of this invention may also contain hydrolytic stabilizers, pigments, dyes, antistatic agents, electrical conductors, fine retardants, reinforcements, fillers, adherent additives, plasticizers and mold-release agents, etc.

The molded products of this invention, especially the injection-molded products, have excellent moldability, good mold-release properties, better surface appearance and shorter molding cycles than those previously exhibited by polyetherester having superior resistance to heat, light and oil, in addition to flexibility and rubber elasticity. Furthermore, inherent characteristics of the polyetherester are either minimized, or improved as in the case of rubber elasticity and resistance to oil. The following examples further illustrate the invention.

All parts and percentages disclosed in the following examples are by weight, and inherent viscosities of the polymers are measured at 30° C. at a concentration of 0.5 weight percent in o-chlorophenol.

EXAMPLE 1

In a glass flask having a stainless steel stirrer with a helical ribbon type screw, 94.5 parts of dimethyl terephthalate, 41.5 parts of dimethyl isophthalate, 38.5 parts of poly-(tetramethylene oxide)glycol having an average molecular weight of about 1,000, and 94.5 parts of 1,4-butanediol were placed in the presence of 0.10 parts of tetrabutyl titanate. The mixture was heated with stirring at 210° C. for 2 hours to distil off methanol from the reaction system. The recovered methanol amounted to 42.6 parts, which corresponds to 95% of the theoretical weight. After adding 0.42 parts of "Irganox" 1010 (Trademark of an antioxidant comprising tetrakis[-methylene 3-(3′,5′-di-t-butyl-4′-hydrophenyl)propionate]methane which is manufactured by Ciba-Geigy Corp.) to the reaction mixture, the reaction temperature was raised to 245° C. and the pressure on the system was reduced to 0.1 mm Hg for a period of 50 minutes. Polymerization was continued for 2 hours under these conditions. The resultant polyetherester (A) has a melting point of 169° C. and an inherent viscosity of 0.95.

In another step, a powder of poly(butylene terephthalate) having less than 150 mesh particle size was prepared by crushing the dried poly(butylene terephthalate) pellets in a mill and then classifying them. The degree of crystallization of the powder was shown by X-ray diffraction to be 53%.

The blend composition, prepared by dry-blending approximately 2 parts of poly(butylene terephthalate) powder with 100 parts of polyetherester (A) pellets, was injection-molded to form JIS No. 3 dumbbell specimens under conditions of cylinder temperature of 215° C. and mold temperature of 60° C. Test pieces were molded in a relatively short molding cycle of about 25 seconds and easily released from the mold. The molded products showed good surface appearance without sink marks.

For comparison, polyetherester without a blending of poly(butylene terephthalate) powder was injection-molded under the same conditions as above. In a molding cycle of less than 50 seconds it was difficult to obtain release of the test pieces from the mold, and sink marks occurred. Furthermore, known nucleating agents such as talc, sodium stearate and aluminum oxide were used for control purposes. Although this improved the mold release properties slightly, large sink marks occurred on the surface of the test pieces and there was almost no increase in the crystallization rate.

By using JIS No. 2 dumbbell specimens obtained from the blend of polyetherester (A) with poly(butylene terephthalate) powder in Example 1, physical properties and chemical resistance were tested. The results are shown in Table 1-1, along with data on polyetherester (A).

TABLE 1-1

|  | Polyetherester (A) + PBT Powder | Polyetherester (A) |
|---|---|---|
| Moldability |  |  |
| Mold release | O | X |
| Surface Appearance | O | X |
| Hardness, Shore D | 52 | 54 |
| Tensile Strength (kg/cm²) | 220 | 200 |
| Elongation at Break (%) | 460 | 430 |
| Tensile Modulus (kg/cm²) | 1200 | 1200 |
| Tensile Set at 50% | 50 | 55 |
| Elongation, 70° C., 22 HR |  |  |
| Thermal Resistance (HR) |  |  |
| 50% Retention of Elongation at 120° C. | 330 | 300 |
| Weathering Resistance (HR) |  |  |
| 50% Retention of Elongation in Fade-O-Meter | 140 | 105 |
| Oil Swell (%) |  |  |
| ASTM No. 3 Oil, 100° C., 1 week | 6 | 6 |

EXAMPLE 2

In this example the effect of the blending temperature of poly(butylene terephthalate) on increasing crystallization rate was judged by the degree of crystallinity as measured by a Perkin-Elmer Differential Scanning Calorimeter, and by density.

J.I.S. No. 2 dumbbell specimens were injection-molded from a dry-blend of about 100 parts of polyetherester (A) used in Example 1 with 2.5 parts of poly(butylene terephthalate) at molding temperatures in the range of 200°–240° C. and a mold temperature of 60° C., with a molding cycle of 30 seconds. Control specimens without poly(butylene terephthalate) were also molded. Crystallization temperature (Tc) and density of the above specimens were measured by D.S.C. and a density gradient column. These results are listed in Table 1-2.

TABLE 1-2

| Additives | Molding Temperature (°C.) | Moldability Mold Release | Moldability Surface Appearance | Tc*[2] (°C.) | Density*[3] (g/cc) |
|---|---|---|---|---|---|
| 2.5 Parts of PBT*[1] | 200 | Fair | Fair | 139 | 1.247 |
| 2.5 Parts of PBT*[1] | 210 | Excellent | Excellent | 151 | 1.248 |
| 2.5 Parts of PBT*[1] | 220 | Excellent | Excellent | 145 | 1.248 |
| 2.5 Parts of PBT*[1] | 240 | Poor | Poor | 130 | 1.244 |
| None | 200 | Poor | Poor | 121 | 1.244 |
| None | 210 | Poor | Poor | 120 | 1.243 |
| None | 220 | Poor | poor | 120 | 1.243 |
| None | 240 | Poor | Poor | 118 | 1.243 |
| 0.5 Parts of Talc | 220 | Fair | Poor | 132 | 1.245 |
| 2.5 Parts of Talc | 220 | Excellent | Poor | 135 | 1.245 |

*[1]Poly(butylene terephthalate) powder: the same as used in Example 1
*[2]Measured with a cooling rate of 10° C./min, after heated to 220° C. at a rate of 10° C./min. and dwelt for 5 minutes.
*[3]Density of polyetherester corrected by density of additives.

EXAMPLE 3

A polyetherester (B) was polymerized in the same manner as Example 1 except that 135 parts of dimethyl terephthalate, 94.5 parts of butanediol and 86.2 parts of poly(tetramethylene oxide)glycol were used. A polyetherester (B) containing 58% hard segments of butylene terephthalate units and 42% soft segments was obtained. The resulting polyetherester (B) had a melting point of 204° C. and an inherent viscosity of 1.2.

Some proportions of poly(butylene terephthalate) powder were dry-blended with polyetherester (B) and mixed in a 30 mm φ single screw extruder at 240° C. The melt viscosities of the blends were measured with a Melt Indexer in the temperature range of 220°–250° C.

The mount of poly(butylene terephthalate) powder and the results are listed in Table 2.

The remarkable effect of increasing viscosity was observed in the measuring temperature range of 220°–230° C. By using the blends blow moldability was also significantly improved.

TABLE 2

| Measuring Temperature (°C.) | PBT Powder (Parts) | | |
|---|---|---|---|
|  | 0 | 5 | 10 |
| 220 | 15,500 | 40,000 | 60,000 |

TABLE 2-continued

| Measuring Temperature (°C.) | PBT Powder (Parts) | | |
|---|---|---|---|
| | 0 | 5 | 10 |
| 230 | 10,700 | 19,000 | 29,000 |
| 240 | 8,900 | 12,000 | 15,500 |
| 250 | 7,400 | 9,200 | 9,200 |

Unit: Poises (at a Shear Rate of $10^2 \sec^{-1}$)

EXAMPLE 4

A polyetherester (C) was prepared in a manner similar to Example 1 by using 136 parts of dimethyl terephthalate, 58 parts of dimethyl phthalate, 160 parts of poly(tetramethylene oxide)glycol having an average molecular weight of about 1000, and 135 parts of 1,4-butanediol. The resulting polyetherester (C) had a melting point of 145° C. and an inherent viscosity of 1.4.

Selected proportions of poly(butylene terephthalate) powder were blended with polyetherester (C) under the blending conditions listed in Table 3. The blends were injection-molded and tested for moldability and for other physical properties. When the amount of PBT was increased, delamination on the surface of molded articles became apparent and the properties of the molded articles, such as flexibility and rubber elasticity, were decreased. Processing above the poly(butylene terephthalate) melting point did not greatly improve moldability. When the microstructures of blends No. 1, No. 3 and No. 6 were observed by optical microscopial methods, such as phase-contrast or depolarized light, it was apparent that the microstructure of blend No. 6 had not changed significantly when compared with blend No. 1. Blend No. 1 was comprised of minute spherulites of less than 1 μm (which disappeared at a temperature of about 140° C.), while blend No. 3 was comprised of dispersed spherulites of approximately 10 to 50 microns which did not disappear when the blend was heated to a temperature near 230° C.

TABLE 3

| No. | 1 | 2* | 3* | 4* | 5 | 6 | 7 |
|---|---|---|---|---|---|---|---|
| PBT Powder (parts) | 0 | 1.0 | 5.0 | 10 | 25 | 5.0 | 25 |
| Molding Temperature (°C.) | 220 | 220 | 220 | 220 | 220 | 250 | 250 |
| Mold Release | X | O | O | O | O | X | X |
| Surface Appearance | X | Δ~O | O | O | X | X | X |
| Hardness, Shore D | 36 | 36 | 36 | 37 | 40 | 37 | 39 |
| Flexural Modulus (kg/cm²) | 320 | 320 | 330 | 650 | 2200 | 500 | 2100 |
| Elastic Recovery (%) after 100% Elongation, Holding Time of 10 min. | 88 | 90 | 91 | 90 | 75 | 84 | 77 |

*The approximate range of this invention

EXAMPLE 5

Using 97 parts of dimethyl terephthalate, 97 parts of dimethyl isophthalate, 80 parts poly(tetramethylene oxide)glycol having an average molecular weight of about 1000, and 135 parts of 1,4-butanediol, in the same manner as Example 1, a polyetherester (D) was prepared that had an inherent viscosity of 1.05 and a melting point of 120° C.

After dry-blending 2.5 parts of poly(butylene terephthalate) powder with 100 parts of the polyetherester (D) pellets and melt-blending them in a 30 mm φ single-screw extruder at one of the temperatures listed in Table 4, extrudate in the shape of a 3 mm φ gut was quenched in water at 5° C., and the whitening time of the extrudate was measured. Whitening behavior may be due to crystalline growth, and the whitening time may correspond to the time it takes the extrudate to lose its adhesion.

For comparison purposes, the results of tests on a blend containing no poly(butylene terephthalate) powder are listed in Table 4.

TABLE 4

| | Extrusion Temperature (°C.) | Whitening Time (sec) |
|---|---|---|
| Polyetherester (D) + PBT Powder | 190 | 90 |
| Polyetherester (D) + PBT Powder | 200 | 8 |
| Polyetherester (D) + PBT Powder | 220 | 5 |
| Polyetherester (D) + PBT Powder | 240 | 180 |
| Polyetherester (D) | 190 | 180 |
| Polyetherester (D) | 200 | 240 |
| Polyetherester (D) | 220 | 300 |
| Polyetherester (D) | 240 | 360 |

EXAMPLE 6

292 Parts of dimethyl terephthalate, 125 parts of dimethyl isophthalate, 100 parts of poly(tetramethylene oxide)glycol having an average molecular weight of about 1000, 350 parts of 1,4-butanediol, and 0.3 parts of tetrabutyl titanate were placed into a glass flask and heated at 210° C. for 2 hours. Methanol was recovered in an amount corresponding to 95% of the theoretical weight. Then 1.3 parts of "Irganox" 1010 were added to the reaction mixture, the reaction temperature was raised to 245° C. and the pressure was reduced to 0.2 mm Hg for a period of 30 minutes. Polymerization was continued for another 3 hours under these conditions. The product was extruded into water and pelletized. The polyetherester (E) thus obtained consisted of 80% hard segments, which are copolymers of poly(butylene terephthalate)/isophthalate (70:30) and 20% soft segments, which are poly(tetramethylene oxide)glycol. Said polymer (E) had a melting point of 165° C. and an inherent viscosity of 0.90.

5 parts of poly(butylene terephthalate) having a degree of crystallization of 45% when measured by X-ray diffraction, an inherent viscosity of 0.92 and a particle size of less than 100 μm, and 100 parts of polyetherester (E) were dry-blended, vacuum, dried and mixed in a 30 mm φ single screw extruder at 240°, 225°, 210° and 195° C. The melt viscosities of the blends were measured by a Melt Indexer at a temperature in the range of 190°–250° C. The results are listed in Table 5. In order to correlate the change in molecular weight, the inherent viscosity of all samples is also listed.

As summarized in Table 5, a remarkable increase in viscosity was observed when the mixing temperature was above about 210° C., and the measuring temperature was within a range of about 190°–220° C.

TABLE 5

| Measuring Temperature (°C.) | Extrusion Temperature (°C.) | | | | |
|---|---|---|---|---|---|
| | 195 | 210 | 220 | 240 | Control |
| 190 | 11,000 (0.90) | 19,000 (0.90) | 23,000 (0.90) | 16,500 (0.89) | 11,000 (0.90) |
| 200 | 8,100 (0.90) | 18,000 (0.90) | 19,000 (0.90) | 14,000 (0.89) | 8,000 (0.90) |
| 220 | 4,500 (0.90) | 5,300 (0.90) | 5,800 (0.90) | 5,200 (0.89) | 4,400 (0.90) |
| 240 | 2,600 (0.89) | 2,700 (0.89) | 2,700 (0.88) | 2,600 (0.88) | 2,600 (0.89) |

Unit: poises (at a Shear Rate of $10^2 \sec^{-1}$)
Figures in parentheses mean inherent viscosity

EXAMPLE 7

The tube (E-1) having inner and outer diameters of 3.5 mm and 8 mm was prepared from pellets mixed at 220° C. as in Example 6 by a sizing plate method. The tube-extrusion was carried out by using a 45 mm φ single screw (L/D=23) extruder at 200° C. and a cooling bath at 5° C. The physical properties of the tube are listed in Table 6.

For control purposes, a tube (E-2) was formed from pellets mixed at 195° C. as in Example 6 and another tube (E-3) was formed from polyetherester (E) pellets that did not contain poly(butylene terephthalate) powder. Tube (E-1) was round and did not exhibit any tube extrusion problems. Tube (E-3) was not round due to adhesion between the extrudates and the sizing plate, and a sag between the die and the sizing plate. Tube (E-2) was also not round due to sag between the die and the sizing plate.

TABLE 6

| Property | Unit | |
|---|---|---|
| Tensile Strength | kg/cm² | 350 |
| Elongation at Break | % | 540 |
| Tensile Modulus | kg/cm² | 1300 |
| Flexural Modulus | kg/cm² | 1500 |
| Minimum Flexural Radius | mm | 23 |
| Elastic Recovery after 50% Elongation | % | 75 |

EXAMPLE 8

A polyetherester (F) was prepared in the same manner described in Example 6 by using 95 parts of dimethyl terephthalate, 41 parts of dimethyl isophthalate, 140 parts of poly (tetramethylene oxide) glycol having an average molecular weight of about 1000 and 135 parts of 1,4-butanediol. The polymer had an inherent viscosity of 1.15 and a melting point of 150° C. The poly (butylene terephthalate) powder used in Example 6 was dry-blended with 100 parts of the polyetherester (F) having an amount of poly(butylene terephthalate) as listed in Table 7. The dry-blends were mixed in a 30 mm 0 single screw extruder at a mixing temperature of 220° C. The melt index of the extrudates was measured at 200° and 240° C.; the results are listed in Table 7.

The extrudates were then film-extruded and the physical properties of the film were measured. When the amount of poly (butylene terephthalate) was too great the physical properties of the film diminished.

TABLE 7

| | Control | Examples | | | Control |
|---|---|---|---|---|---|
| PBT (parts) | 0 | 0.5 | 3.0 | 10 | 25 |
| MI*¹ (g/lo min) | | | | | |
| 200° C. | 27 | 21 | 10 | 1.3 | 0.7 |
| 240° C. | 86 | 86 | 84 | 77 | 48 |
| Film Moldability | Adhesion | Excellent | Excellent | Excellent | Poor |
| Surface Appearance | Excellent | Excellent | Excellent | Excellent | Rough |
| Physical Property | | | | | |
| Tensile Strength (kg/cm²) | 210 | 215 | 230 | 250 | 180 |
| Elongation at Break (%) | 700 | 720 | 670 | 520 | 120 |
| Tensile Modulus (kg/cm²) | 480 | 470 | 490 | 600 | 1200 |
| Elastic Recovery*² (%) | 90 | 91 | 90 | 84 | 40 |

*¹2160 g load
*²50% elongation

EXAMPLE 9

5 parts of poly(butylene terephthalate) pellets having an inherent viscosity of 0.85 and 100 parts of polyetherester (F) as used in Example 8 were mixed in a 45 mm φ Dulmage-screw extruder at 240° C. and pelletized.

The above blends and the control polyetherester (F) were blow molded by a Kautex Werk blow molding machine utilizing a 40 mm φ screw under the following conditions.

| Molding temperature | rear temperature | 180° C. |
|---|---|---|
| | front temperature | 195° C. |
| | head temperature | 195° C. |
| | nozzle temperature | 200° C. |
| Die diameter | inner die | 20 mm |
| | outer die | 30 mm |
| Mold shape | 90 mm φ × 100 mm bottle | |
| Mold temperature | | 70° C. |
| Blow pressure | | 3 kg/cm² |

Runaway of the parison from PBT-containing pellets was slower than that from those containing no PBT. Consequently, the bottle prepared from the PBT-containing pellets was of uniform thickness.

EXAMPLE 10

1.0 part of poly(butylene terephthalate) powder and 100 parts of polyetherester (A) pellets were dry-blended. Test pieces of 1 mm thickness were injection-molded out of the dry-blend at cylinder temperature of 215° C. and 240° C., a mold temperature of 40° C. and a molding cycle of 30 seconds. The amounts of poly(butylene terephthalate) were varied according to the conditions listed in Table 8. The transparency of the molded articles was measured with Direct Reading Haze Meter.

TABLE 8

| PBT Amounts (parts) | Molding Temperature (°C.) | Moldability Mold Release | Moldability Surface Appearance | Transmission (%) Not-annealed | Transmission (%) Annealed* |
|---|---|---|---|---|---|
| 1.0 | 215 | Excellent | Excellent | 73 | 73 |
| 1.0 | 240 | Poor | Sink Mark | 52 | 47 |
| 5.0 | 215 | Excellent | Excellent | 64 | 63 |
| 5.0 | 240 | Poor | Sink Mark | 34 | 34 |
| 0 | 215 | Poor | Sink Mark | 38 | 19 |
| 0 | 240 | Poor | Sink Mark | 30 | 12 |

*Annealed 5 hours at 80° C.

EXAMPLE 11

To 100 parts by weight of the polyetherester (E) obtained in Example 6, the pellets of poly(butylene terephthalate) and the lubricants as shown in Table 9 were added and dry-blended. The mixture was melt-blended and pelletized in an extruder maintained at a temperature of 240° C. in the cylinder.

The pellets thus obtained were blow-molded by use of the same method as employed in Example 9. Melt Index of the pellets was measured at 200° C. Furthermore in order to evaluate the draw-down and the extensibility in the melt, the melt strength and the take-up speed at break were measured by the method in which the melt of the pellets was extruded to a shape of gut having a diameter of 2.1 mm at 190° C. and the gut was taken-up at a constantly accelerating speed. This measurement was carried out using a laboratory plastmill with a melt strength measurement device produced by Toyo-Seiki Co., Ltd.

The results were summarized in Table 9 and it can be seen therefrom that the blow moldability of polyetherester is highly improved by blending poly(butylene terephthalate) solely or in combination with ester waxes, calcium soaps and/or olefin waxes.

TABLE 9

| Additives (parts by weight) | Blanc | PBT (5) | PBT (5) "Hoechst Wax" PA-190 (0.2) | PBT (5) "Hoechst Wax" OP (0.2) | PBT(5) "Hoechst Wax" E (0.2) | PBT (5) "Hoechst Wax" GL-3 (0.2) | PBT (5) Hoechst Wax OP (0.1) "Hoechst Wax" PA-190 (0.1) | PBT (5) Calcium Stearate (0.1) |
|---|---|---|---|---|---|---|---|---|
| Melt Index (200° C.) | 11.2 | 2.1 | 2.3 | 2.5 | 2.4 | 2.5 | 2.3 | 2.5 |
| Melt Strength (g) | 0.8 | 7.5 | 8.5 | 7.1 | 7.2 | 7.3 | 7.5 | 7.5 |
| Take-up Speed at Bread (m/min) | 240 | 29 | 20 | 69 | 61 | 70 | 75 | 64 |
| Blow-moldability | X | O | O | O | O | O | O | O |
| Appearance of Bottle | X | O | O | ⊚ | ⊚ | ⊚ | ⊚ | ⊚ |

EXAMPLE 12

Polyetherester (E) 100 parts by weight and poly(butylene terephthalate) 1 part by weight were melt-blended and pelletized by a 30 mm φ single screw extruder at a cylinder temperature of 240° C. The pellets thus obtained were extrusion molded to a tube (E-4) by the same method as employed in Example 7 at a barrel temperature of 185° C. and a cooling bath temperature of 30° C.

By the same method a tube (E-5) was prepared from polyetherester (E) without blending PBT for the purpose of control.

The tube (E-5) was somewhat distorted because the surface of the tube is highly cohesive in melt. Meanwhile, the tube (E-4) had such a small cohesion that extrusion molding was easily operated.

Test specimens having 1 mm thickness were prepared from tubes (E-4) and (E-5), and percent transmission was measured by use of a Haze Meter type SEP-TU produced by Nihon Seimitsu Kogaku Co., Ltd. The tubes (E-4) and (E-5) had percentages of transmission of 75% and 45% respectively.

What we claim is:

1. In a process for extrusion molding an elastomeric blockcopolyetherester comprised of from about 5% to 80% by weight of polyether soft segment and about 95% to 20% by weight of a polyester hard segment, said polyether soft segment being poly(butylene oxide) having an average molecular weight of about 300 to 6,000 and more than about 40 mol. % of said polyester hard segment being poly(butylene terephthalate), the improvement which comprises the steps of mixing about 0.1 to 10 parts by weight of poly(butylene terephthalate) with about 100 parts by weight of a blockcopolyetherester at a temperature above about 200° C., whereby fine fragments of poly(butylene terephthalate), maintained in a crystalline phase, are dispersed in the matrix of the blockcopolyetherester, and then extrusion molding the mixture at a temperature below the melting point of the poly(butylene terephthalate).

2. A process according to claim 1, wherein the blockcopolyetherester comprises about 15 to 70% by weight of a polyether soft segment and about 85 to 30% by weight of a polyester hard segment.

3. A process according to claim 1, wherein the polyester hard segment consists essentially of poly(butylene terephthalate).

4. A process according to claim 1, wherein the polyester hard segment consists essentially of copoly(butylene terephthalate-isophthalate).

5. A process according to claim 1, wherein the amount of the poly(butylene terephthalate) is 0.5 to 5 parts by weight.

6. A process according to claim 1, wherein the poly(butylene terephthalate) is used in a form of particles having an average diameter of less than about 200 μm.

7. In a process for extrusion molding an elastomeric blockcopolyetherester comprised of from about 5% to 80% by weight of a polyether soft segment and about 95% to 20% by weight of a polyester hard segment, said polyether soft segment being poly(butylene oxide) having an average molecular weight of about 300 to 6,000 and more than about 40 mol. % of said polyester hard segment being poly(butylene terephthalate), the improvement which comprises the steps of mixing about 0.1 to 10 parts by weight of poly(butylene terephthalate) and about 0.05 to 5.0 parts by weight of at least one member selected from the group consisting of ester waxes and calcium soaps with about 100 parts by weight of a blockcopolyetherester at a temperature of above 200° C., whereby fine fragments of poly(butylene terephthalate), maintained in a crystalline phase, are dispersed in the matrix of the blockcopolyetherester, and then extrusion molding the mixture at a temperature below the melting point of the poly(butylene terephthalate).

* * * * *

UNITED STATES PATENT AND TRADEMARK OFFICE
CERTIFICATE OF CORRECTION

PATENT NO. : 4,315,882

DATED : 2/16/82

INVENTOR(S) : Hiratsuka, Motoki; et al

It is certified that error appears in the above—identified patent and that said Letters Patent is hereby corrected as shown below:

Column 6, line 43, delete "fine" and substitute --fire--.

Column 11, line 54, delete "Modulus" and substitute --Molulus--.

Column 11, line 55, delete "Modulus" and substitute --Molulus--.

Column 12, line 5 delete "0" and substitute --$\phi$--.

Signed and Sealed this

Eleventh Day of May 1982

[SEAL]

Attest:

Attesting Officer

GERALD J. MOSSINGHOFF

Commissioner of Patents and Trademarks